United States Patent [19]

Taipale et al.

[11] 4,195,660
[45] Apr. 1, 1980

[54] REED VALVE

[75] Inventors: Dale L. Taipale, Libertyville; Richard A. Wlezien, Antioch, both of Ill.

[73] Assignee: Outboard Marine Corporation, Waukegan, Ill.

[21] Appl. No.: 891,820

[22] Filed: Mar. 30, 1978

Related U.S. Application Data

[63] Continuation-in-part of Ser. No. 673,524, Apr. 5, 1976, abandoned.

[51] Int. Cl.² .............................................. F16K 15/14
[52] U.S. Cl. ............................... 137/512.1; 137/512.3; 137/856
[58] Field of Search ............ 137/512.1, 512.15, 512.4, 137/512.3, 855, 856, 857, 858

[56] References Cited

U.S. PATENT DOCUMENTS

| 1,494,176 | 5/1924 | Little ........................................ 137/856 |
| 2,160,401 | 5/1939 | Engelman ........................ 137/512.15 |
| 2,311,833 | 2/1943 | Holland-Letz .................. 137/855 X |
| 2,417,246 | 3/1947 | Ferguson ..................... 137/512.15 X |
| 3,286,728 | 11/1966 | Stephenson .......................... 137/856 |

FOREIGN PATENT DOCUMENTS 380901 7/1973 U.S.S.R. ................................ 137/512.1

Primary Examiner—William R. Cline
Attorney, Agent, or Firm—Michael, Best & Friedrich

[57] ABSTRACT

Disclosed herein is a reed valve comprising a reed plate having apertures therein defining a first port and a second port together with seats respectively extending along the periphery of each of the ports. The reed valve also includes a first reed member having a first port closing portion and a second reed member having a second port closing portion. The reed members are mounted on the reed plate for respective movement of the first and second port closing portions relative to the first and second ports, which reed members have different natural frequencies when mounted on the reed plate.

2 Claims, 7 Drawing Figures

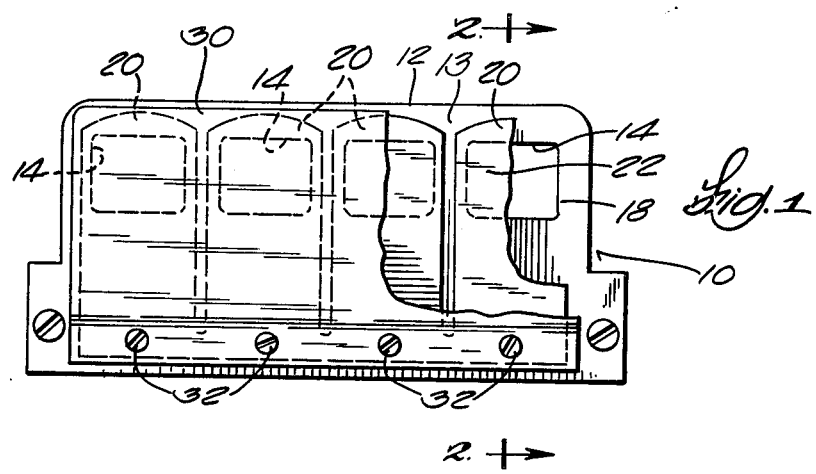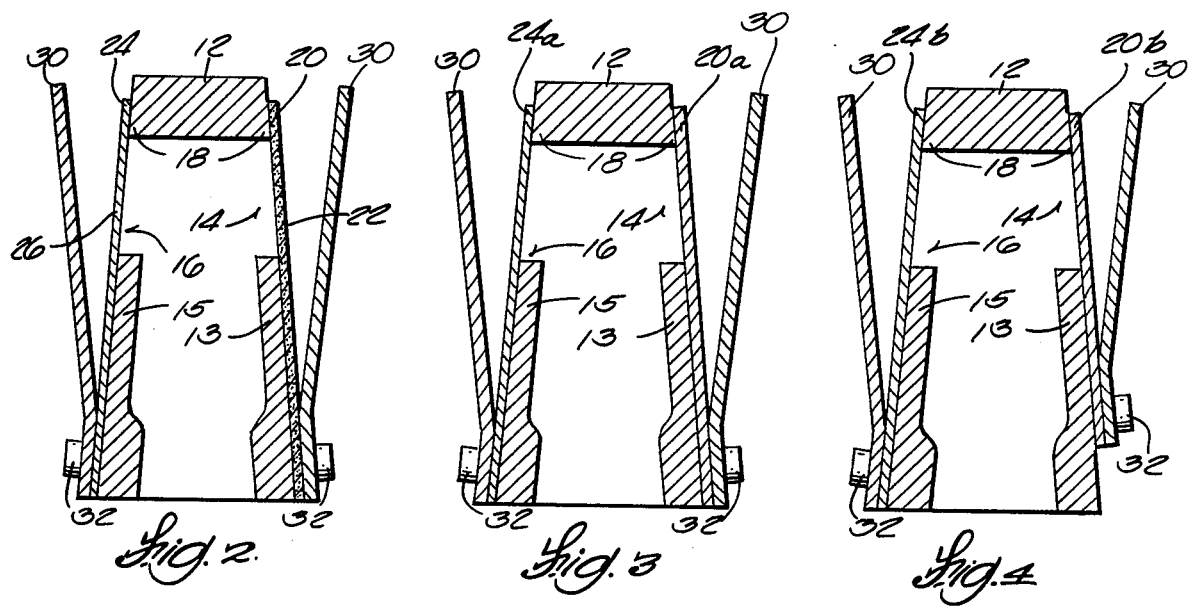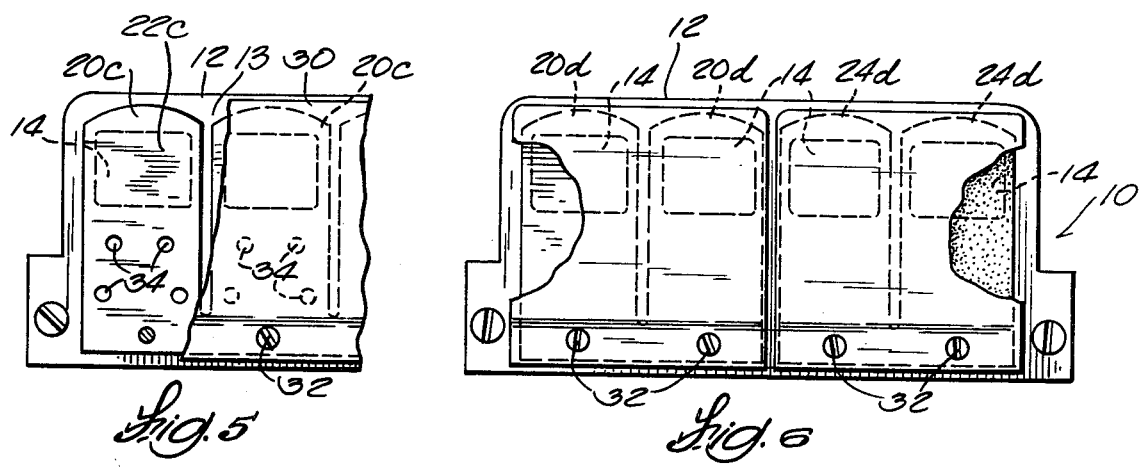

REED VALVE

This application is a continuation in part of application Ser. No. 673,524, now abandoned.

BACKGROUND OF THE INVENTION

The invention relates to reed valves. A prior reed valve is disclosed in Stevenson U.S. Pat. No. 3,286,728 issued Nov. 22, 1966.

SUMMARY OF THE INVENTION

The invention provides a reed valve having ports and associated reed members with different natural frequencies, which reed members facilitate superior fuel and/or air flow characteristics through the ports in response to a periodic pressure differential activating the reed members.

In accordance with an embodiment of the invention, there is provided a reed valve comprising a reed plate having means therein defining a first port and a second port together with seats respectively extending along the periphery of each of the ports. The reed valve has a first reed member including a first port closing portion and a second reed member including a second port closing portion. The reed members are mounted on the reed plate for respective movement of the first and second port closing portions relative to the first and second ports, which reed members have different natural frequencies when mounted on the reed plate.

In accordance with an embodiment of the invention, there is provided a reed valve wherein the first and second reed members are respectively differentially fabricated.

In accordance with an embodiment of the invention, there is provided a reed valve wherein the first reed member is mounted on the reed plate at a first position and wherein the second reed member is mounted on the reed plate at a second position, the distance from the first position to the first port being different than the distance from the second position to the second port.

In accordance with an embodiment of the invention, there is provided a reed valve wherein the first reed member has a first natural frequency, and wherein the second reed member has a second natural frequency, which second natural frequency is different in magnitude from the first natural frequency by at least 20% of the magnitude of the first natural frequency.

One of the principal features of the invention is the provision of a reed valve having ports and respectively associated reed members with different natural frequencies, which reed members facilitate superior fuel and/or air flow characteristics through the ports in response to the variable frequency of a periodic pressure differential activating the reed members.

Other features and advantages of the embodiments of the invention will become known by reference to the following drawings, general descriptions and claims.

DESCRIPTION OF THE DRAWINGS

FIG. 1 is a partially broken away front plan view of a reed valve embodying various of the features of the invention.

FIG. 2 is a side sectional view taken along line 2—2 of FIG. 1.

FIG. 3 is a side sectional view of a modified construction of the reed valve of FIG. 1, illustrating an alternative embodiment of the invention.

FIG. 4 is a side sectional view of a modified construction of the reed valve of FIG. 1, illustrating another alternative embodiment of the invention.

FIG. 5 is a partially broken away front plan view of a modified portion of the reed valve of FIG. 1, illustrating another alternative embodiment of the invention.

FIG. 6 is a partially broken away front plan view of a modified construction of the reed valve of FIG. 1, illustrating another alternative embodiment of the invention.

Figure 7:
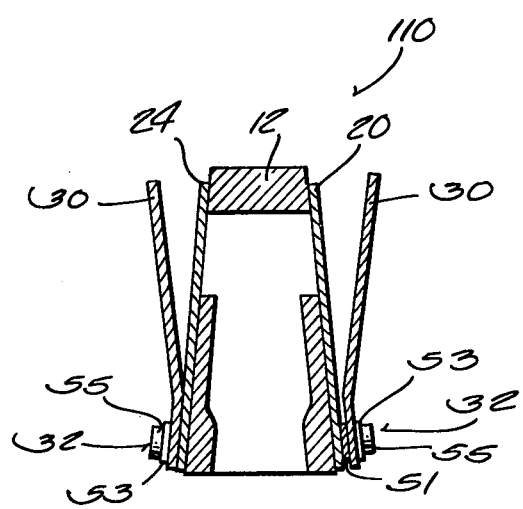
FIG. 7 is a sectional side view of another embodiment of a reed valve embodying various of the features of the invention.

Before explaining the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in the drawings is a reed valve 10 comprising a reed plate or element 12 having means or apertures therein defining a first port 14 and a second port 16. Seats 18 are provided which respectively extend along the periphery of each port. The reed plate or element 12 can be formed in various ways, as for instance, by aluminum die casting. Preferably, the reed plate or element 12 includes a first sidewall 13 having four first ports 14 and also includes a second sidewall 15 having four second ports 16. A specific description of only one first port 14 and one second port 16, along with a description of the respectively associated reed members, will be given, which description should provide an adequate understanding of the invention.

The reed valve 10 has a first reed member 20 including a first port closing portion 22 and has a second reed member 24 including a second port closing portion 26. The reed members 20 and 24 can be respectively mounted in various ways, such as by the use of screws 32, on the sidewalls 13 and 15 of the reed plate 12, which mounting allows respective movement of the first and second port closing portions 22 and 26 relative to the first and second ports 14 and 16. The respective outward travel of the reed members 20 and 24 away from the ports 14 and 16 is limited by reed stops 30, which reed stops are also preferably secured to the sidewalls of the reed plate 12 by screws 32.

The first and second reed members 20 and 24 have different natural frequencies when mounted on the reed plate 12. In order to provide the reed plate 12 with reed members having different natural frequencies, the reed members 20 and 24 can be respectively fabricated from different materials, such as stainless steel and fiberglass, as diagrammatically shown in FIG. 2. Other alternative embodiments of the invention having reed members with different natural frequencies are shown in FIGS. 3 through 6, wherein the modified parts of the reed valve 10 are indicated by the addition of a subscript.

FIG. 3 illustrates a first reed member 20a and a second reed member 24a, which reed members are respectively fabricated with different thicknesses. FIG. 4 illustrates a first reed member 20b and a second reed member 24b, which reed members are respectively fabricated with different lengths. The first reed member 20b is mounted on the reed plate 12 at a first position by a screw 32 and the second reed member 24b is mounted on the reed plate 12 at a second position by another screw 32. The distance from the first position to the first port 14 is different than the distance from the second position to the second port 16.

FIG. 5 illustrates another embodiment of the reed valve 10 having reed members with different natural frequencies. A first reed member 20c is fabricated with apertures 34 spaced from the first port closing portion 22c, which apertures vary the bending stiffness of the first reed member 20c. The second reed member 24c (not shown) is fabricated without apertures or with a different pattern, number, and/or size of apertures.

FIG. 6 illustrates a first reed member 20d and a second reed member 24d mounted on the same sidewall 13 of the reed plate 12. The reed members, as diagrammatically shown, are fabricated from different materials. It is to be understood that reed members having different natural frequencies can be mounted on one of the sidewalls of the reed plate 12, as well as being respectively mounted on the separate sidewalls 13 and 15 as shown in FIGS. 3 and 5.

FIG. 7 illustrates a reed valve construction 110 including a reed plate or element 12 which is generally identically constructed as hereinbefore explained, including reed stops 30 which are generally identically constructed as hereinbefore explained, and including reed members 20 and 24 which are generally identically constructed as hereinbefore explained, and in which the reed members 20 and 24 and reed stops 30 are mounted on the opposite sides of the reed plate or element 12 in generally identically the same way as hereinbefore explained by screws 32, except that, on one side or face of the reed plate 12, a shim 51 is sandwiched between the reed member 20 and the reed stop 30, with the result that the reed member 20 operates at a natural frequency different from the reed member 24 on the other side or face of the reed plate 12. While other constructions can be employed, in the construction illustrated in FIG. 7, the shim 51 is a metallic rectangular bar having a thickness of about 0.012 inches and having a length slightly less than the length of the reed member 20 in the direction of a straight line intersecting the axis of the screws 32.

In addition, a washer 53 can be employed between the reed stop 30 and the head 55 of each of the screws 32.

Suitable arrangements can be provided for securing the reed plate 12 about an opening in an engine housing, such as a crank case (not shown), which housing is subject to a periodic pressure variation or differential during engine operation. The first and second reed members 20 and 24 are activated to and from engagement with the seats 18 by the periodic pressure differential, which reed members thus control fuel and/or air flow through the ports. The fuel and/or air can be supplied to the reed valve 10 from an external source such as a carburetor (not shown).

During engine operation, the periodic pressure variation or differential changes in frequency in response to a change in the engine speed. As the frequency of the periodic pressure differential approaches the natural frequency, or a harmonic frequency thereof, of the first reed members 20, the first reed members approach a condition of resonance or flutter and the fuel and/or air flowing through the first ports 14 associated with the first reed members 20 in resonance is somewhat diminished.

In conventional reed valve arrangements, where the reed members all have the same natural frequency, when the frequency of the periodic pressure differential approaches the natural frequency of the reed members, the reed members tend to move in phase, as well as flutter, further substantially diminishing the fuel and/or air flowing through the ports. More specifically, the reed members in resonance, mounted on opposite or opposing side walls of a reed plate, tend to move in phase or in the same direction at the same time. Thus, when the reed members in resonance on one side wall are moving toward an open position, the reed members in resonance on the opposite side wall are moving toward a closed position, and consequently the fuel and/or air flow through the ports is substantially diminished.

In the described embodiments of the present invention, the reed valve 10 includes first reed members 20 and second reed members 24 having different natural frequencies, and thus the reed valve 10 will exhibit superior fuel and/or flow characteristics in response to the variable frequency of the periodic pressure differential. More specifically, as noted above, when the frequency of the periodic pressure variation or differential approaches the first natural frequency of the first reed members 20, the fuel and/or air flowing through the associated first ports 14 is somewhat diminished. However, the fuel and/or air flowing through the second ports 16 associated with the second reed members 24 is not diminished since the natural frequencies of the first and second reed members 20 and 24 are different, and hence the first and second reed members do not approach a condition of resonance or flutter at the same time.

Further, since the first and second reed members 20 and 24, respectively mounted on the first and second side walls 13 and 15, are not in a condition of resonance at the same time, the first and second reed members do not move in phase and thus the above-described phase related fuel and/or air flow diminishment of the conventional reed valve is substantially eliminated.

In effect, providing a reed valve 10 with first and second reed members having different natural frequencies reduces the relative amount the fuel and/or air flow is diminished as a result of reed member resonance or flutter, and substantially eliminates the above-described phase related fuel and/or air diminishment since the first and second reed members do not move in phase. Preferably, the natural frequency of the first reed member 20 is different in magnitude from the natural frequency of the second reed member 24 by at least 20% of the magnitude of the natural frequency of the second reed member 24.

While the embodiments shown comprise a reed valve 10 having four first ports 14 and four second ports 16, it is to be understood that the number of ports and the arrangement of respectively associated reed members can be varied. Further, the number of reed members having different natural frequencies can be increased, and the differential between the magnitudes of the different natural frequencies of the reed members can be varied.

Various features of the invention are set forth in the following claims:

What is claimed is:

1. A reed valve comprising a reed plate including first and second faces having respective means therein defining respective first and second ports, respective seats extending respectively along the periphery of each of said ports, a first reed member including a first port closing portion, a second reed member including a second port closing portion, first means mounting said first reed member on said first face of said reed plate for movement of said first port closing portion relative to said first port, second means mounting said second reed member on said second face of said reed plate for movement of said second port closing portion relative to said second port, one of said first and second mounting means including shim means for causing the associated one of said reed members to operate at a frequency different from the frequency of the other of said reed members.

2. A reed valve in accordance with claim 1 wherein first and second reed stops are respectively mounted by said first and second mounting means to said first and second faces of said reed plate in outward relation from said first and second reed members, and wherein said shim is located between said first reed member and said first stop.

* * * * *